(12) United States Patent
Li et al.

(10) Patent No.: US 11,270,004 B2
(45) Date of Patent: Mar. 8, 2022

(54) BLOCKCHAIN-BASED TRANSACTION PRIVACY

(71) Applicant: Advanced New Technologies Co., Ltd., Grand Cayman (KY)

(72) Inventors: Lichun Li, Hangzhou (CN); Wenbin Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/163,330

(22) Filed: Jan. 29, 2021

(65) Prior Publication Data

US 2021/0157930 A1  May 27, 2021

Related U.S. Application Data

(63) Continuation of application No. PCT/CN2019/108730, filed on Sep. 27, 2019.

(30) Foreign Application Priority Data

Nov. 5, 2018  (CN) .......................... 201811308520.3

(51) Int. Cl.
*G06F 21/60* (2013.01)
*H04L 9/06* (2006.01)
*G06Q 20/38* (2012.01)

(52) U.S. Cl.
CPC .............. *G06F 21/60* (2013.01); *H04L 9/06* (2013.01); *G06Q 20/389* (2013.01);
(Continued)

(58) Field of Classification Search
CPC . G06F 21/60; H04L 2209/16; H04L 2209/38; H04L 2209/34; G06Q 20/389
See application file for complete search history.

(56) References Cited

U.S. PATENT DOCUMENTS

2017/0132622 A1   5/2017  Naccache et al.
2018/0285869 A1*  10/2018  Li .......................... G06Q 20/12
(Continued)

FOREIGN PATENT DOCUMENTS

CN          106022173          10/2016
CN          106452785           2/2017
(Continued)

OTHER PUBLICATIONS

"A guide to blockchain and data protection". Hogan Lovells. Sep. 2017. Accessed at [https://www.hlengage.com/_uploads/downloads/5425GuidetoblockchainV9FORWEB.pdf] on Oct. 31, 2019. (Year: 2017).*

(Continued)

*Primary Examiner* — Robert B Leung
(74) *Attorney, Agent, or Firm* — Fish & Richardson P.C.

(57) ABSTRACT

A computer-implemented blockchain-based transaction obfuscation method includes: determining a submission time based on a base time and a submission time interval; determining that no actual transaction information is obtained between the base time and the submission time during the submission time interval; generating false transaction information; cryptographically encoding transaction content in the false transaction information; and subsequent to the submission time, submitting the false transaction information to a blockchain to obfuscate a number of actual transactions in the blockchain.

20 Claims, 5 Drawing Sheets

(52) U.S. Cl.
CPC ...... *G06Q 2220/00* (2013.01); *H04L 2209/16* (2013.01); *H04L 2209/34* (2013.01); *H04L 2209/38* (2013.01)

(56) References Cited

U.S. PATENT DOCUMENTS

| | | | |
|---|---|---|---|
| 2019/0088063 A1* | 3/2019 | Unagami | H04L 63/08 |
| 2020/0201846 A1* | 6/2020 | Yang | G06F 16/2379 |

FOREIGN PATENT DOCUMENTS

| | | |
|---|---|---|
| CN | 106549749 | 3/2017 |
| CN | 106936587 | 7/2017 |
| CN | 107578336 | 1/2018 |
| CN | 107615318 | 1/2018 |
| CN | 108198018 | 6/2018 |
| CN | 108694668 | 10/2018 |
| CN | 109934709 | 6/2019 |
| EP | 3144840 | 3/2017 |
| TW | 201734844 | 10/2017 |

OTHER PUBLICATIONS

Voshmgir, S. and Kalinov, V. Sep. 30, 2017. Blockchain: A Beginners Guide. Blockchain Hub. (Year: 2017).*

Yaga, D. et al. Oct. 2018. Blockchain Technology Overview. NISTIR 8202. (Year: 2018).*

Androulaki E, Karame GO. Hiding transaction amounts and balances in bitcoin. In International Conference on Trust and Trustworthy Computing Jun. 3, 2014 (pp. 161-178). Springer, Cham. (Year: 2014).*

Crosby et al., "BlockChain Technology: Beyond Bitcoin," Sutardja Center for Entrepreneurship & Technology Technical Report, Oct. 16, 2015, 35 pages.

Li et al., "RZKPB: A Privacy-preserving Blockchain-Based Fair Transaction Method for Sharing Economy", 2018 17th IEEE International Conference on Trust, Security and Privacy in Computing and Communications/ 12th IEEE International Conference on Big Data Science and Engineering, Aug. 2018, 1164-69.

Nakamoto, "Bitcoin: A Peer-to-Peer Electronic Cash System," www.bitcoin.org, 2005, 9 pages.

PCT International Search Report and Written Opinion in International Application No. PCT/CN2019/108730, dated Dec. 27, 2019, 10 pages (with partial English translation).

Anonymously, "System For Testing Blockchain Transactions," Jul. 3, 2018, IP.COM, 8 pages.

European Extended Search Report in European Application No. 19883275.0, dated Jul. 19, 2021, 10 pages.

PCT International Preliminary Report on Patentability in International Application No. PCT/CN2019/108730, dated May 11, 2021, 11 pages (with English translation).

Lin et al. "Privacy preserving itemset mining through fake transactions," Mar. 2007, Applied Computing 2007, The 22nd Annual ACM Symposium On Applied Computing, pp. 375-379, 5 pages.

* cited by examiner

US 11,270,004 B2

BLOCKCHAIN-BASED TRANSACTION PRIVACY

CROSS-REFERENCE TO RELATED APPLICATIONS

This application is a continuation of PCT Application No. PCT/CN2019/108730, filed on Sep. 27, 2019, which claims priority to Chinese Patent Application No. 201811308520.3, filed on Nov. 5, 2018, and each application is hereby incorporated by reference in its entirety.

TECHNICAL FIELD

Embodiments of the present specification relate to the field of computer technologies, and in particular, to blockchain-based data processing methods, apparatuses, and servers.

BACKGROUND

The blockchain technology is a distributed database technology that ensures that data cannot be tampered with or forged by using cryptography and a consensus mechanism. With the development of computer and Internet technologies, the blockchain technology is highly praised due to features such as decentralization, openness and transparency, and trustworthiness, and is widely used in many scenarios such as smart contracts, securities trading, e-commerce, Internet of Things, social communication, file storage, existence proof, identity verification, and stock ownership crowdfunding.

Currently, when the blockchain technology is applied to the previous scenarios, a transaction quantity of an account is at risk of being leaked to a third party because transaction information of each transaction needs to be sent to a blockchain for verification, implementation, and storage.

To protect privacy, a technical solution that can be used to hide a transaction quantity is in urgent need for services.

SUMMARY

Embodiments of the present specification aim to provide blockchain-based data processing methods and apparatuses, and servers so as to hide a transaction quantity of an account in a blockchain.

To implement the previous objective, the embodiments of the present specification provide a blockchain-based data processing method, including the following: a submission time is calculated based on a base time and a submission time interval; false transaction information is generated when the submission time arrives; privacy protection processing is performed on transaction content in the false transaction information; and the false transaction information is submitted to a blockchain.

To implement the previous objective, the embodiments of the present specification provide a blockchain-based data processing apparatus, including: a calculating unit, configured to calculate a submission time based on a base time and a submission time interval; a generation unit, configured to generate false transaction information when the submission time arrives; an encryption unit, configured to perform privacy protection processing on transaction content in the false transaction information; and a submission unit, configured to submit the false transaction information to a blockchain.

To implement the previous objective, the embodiments of the present specification provide a server, including: a memory, configured to store a computer instruction; and a processor, configured to execute the computer instruction to implement the following steps: calculating a submission time based on a base time and a submission time interval; generating false transaction information when the submission time arrives; performing privacy protection processing on transaction content in the false transaction information; and submitting the false transaction information to a blockchain.

To implement the previous objective, the embodiments of the present specification provide a blockchain-based data processing method, including the following: a submission time is calculated based on a base time and a submission time interval; false transaction information is generated when no actual transaction information to be submitted exists when the submission time arrives; privacy protection processing is performed on transaction content in the false transaction information; and the false transaction information is submitted to a blockchain; or privacy protection processing is performed on transaction content in actual transaction information to be submitted when the actual transaction information exists; and the actual transaction information is submitted to a blockchain.

To implement the previous objective, the embodiments of the present specification provide a blockchain-based data processing apparatus, including: a calculating unit, configured to calculate a submission time based on a base time and a submission time interval; a first submission unit, configured to: generate false transaction information when no actual transaction information to be submitted exists when the submission time arrives; perform privacy protection processing on transaction content in the false transaction information; and submit the false transaction information to a blockchain; and a second submission unit, configured to: perform privacy protection processing on transaction content in actual transaction information to be submitted when the actual transaction information exists; and submit the actual transaction information to a blockchain.

To implement the previous objective, the embodiments of the present specification provide a server, including: a memory, configured to store a computer instruction; and a processor, configured to execute the computer instruction to implement the following steps: calculating a submission time based on a base time and a submission time interval; generating false transaction information when no actual transaction information to be submitted exists when the submission time arrives; performing privacy protection processing on transaction content in the false transaction information; and submitting the false transaction information to a blockchain; or performing privacy protection processing on transaction content in actual transaction information to be submitted when the actual transaction information exists; and submitting the actual transaction information to a blockchain.

It can be seen from the previous technical solutions provided in the embodiments of the present specification that in the embodiments of the present specification, the initiator's server unregularly submits, to the blockchain, the false transaction information whose transaction content undergoes privacy protection processing so that a third party cannot distinguish between the actual transaction information and the false transaction information submitted to the blockchain, thereby hiding a quantity of times of submitting the actual transaction information to the blockchain, and further hiding a transaction quantity of an initiator's account in the blockchain.

BRIEF DESCRIPTION OF DRAWINGS

To describe technical solutions in embodiments of the present specification or in the existing technology more clearly, the following briefly describes the accompanying drawings needed for describing the embodiments or the existing technology. Clearly, the accompanying drawings in the following descriptions merely show some embodiments of the present specification, and a person of ordinary skill in the art can still derive other drawings from these accompanying drawings without creative efforts.

DESCRIPTION OF IMPLEMENTATIONS

The following clearly and comprehensively describes the technical solutions in the embodiments of the present specification with reference to the accompanying drawings in the embodiments of the present specification. Clearly, the described embodiments are merely some rather than all of the embodiments of the present specification. All other embodiments obtained by a person of ordinary skill in the art based on the embodiments of the present specification without creative efforts shall fall within the protection scope of the present specification.

Figure 1:
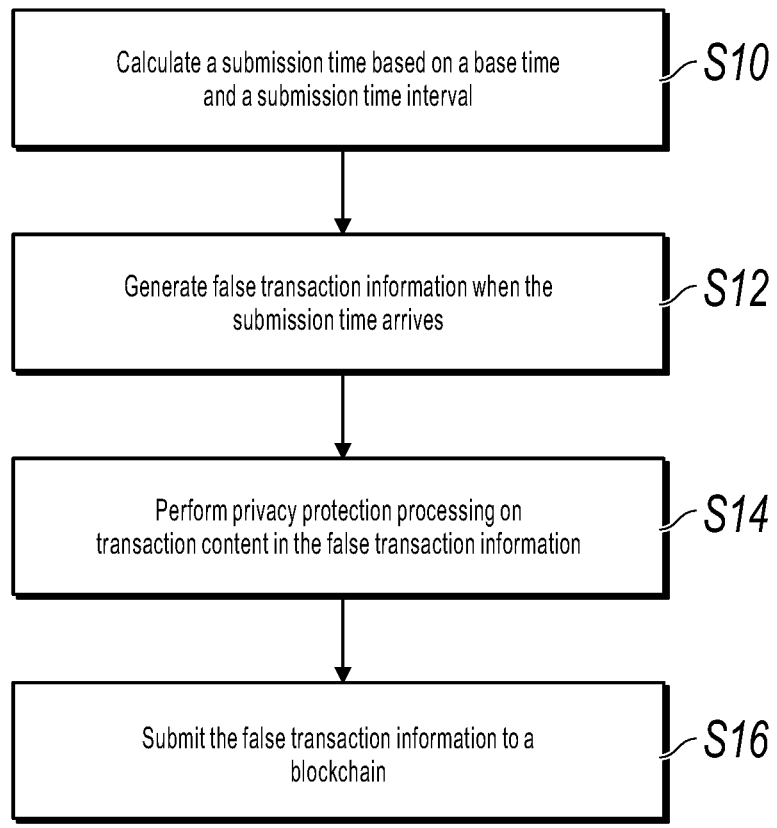
FIG. 1 is a flowchart illustrating a data processing method, according to an embodiment of the present specification.

Referring to FIG. 1, the embodiments of the present specification provide a blockchain-based data processing method.

In some embodiments, the blockchain (Blockchain) can be a distributed ledger that organizes a plurality of pieces of block data in a chain structure in a time sequence, where it is ensured that the distributed ledger is secure, traceable, and untampered with by using a cryptography algorithm. The blockchain can include a public blockchain, a consortium blockchain, a private blockchain, etc. The blockchain can be implemented based on a blockchain network. The blockchain network can include a peer-to-peer network (P2P network) etc. The blockchain network can include a plurality of blockchain nodes. All the blockchain nodes maintain a unified blockchain ledger.

In some embodiments, the data processing method is executed by an initiator's server. The initiator's server can join the blockchain network as a blockchain node. An initiator's account can be logged in to the initiator's server. The initiator's account can be an account of an initiator in the blockchain. The initiator's server can communicate with a client. For example, the client can be a smartphone, a tablet electronic device, a portable computer, a personal digital assistant (PDA), or an intelligent wearable device. In addition, it is worthwhile to note that, base on different services that the data processing method is applied, types of the initiator can be the same or different, and types of the initiator's account can be the same or different. For example, the data processing method can be applied to a transfer service. As such, the initiator can be a payer. The initiator's account can be a payer's account. For another example, the data processing method can be applied to a storage service. As such, the initiator can be a depositor for information stored. The initiator's account can be a depositor account.

The data processing method can include the following steps.

Step S10: Calculate a submission time based on a base time and a submission time interval.

In some embodiments, the base time can include at least one of the following: a latest time of submitting false transaction information to the blockchain or a latest time of submitting actual transaction information to the blockchain.

The actual transaction information possibly is sent by the client. Specifically, the client can send transaction information to the initiator's server. The initiator's server can receive the transaction information as the actual transaction information. Alternatively, the actual transaction information can be entered by a user. Specifically, the user can enter transaction information on the initiator's server. The initiator's server can receive the transaction information entered by the user as the actual transaction information. Certainly, the actual transaction information can be obtained in another method. This is not specifically limited here in some embodiments. The actual transaction information can include transaction content and an initiator's account identifier of the initiator's account. The transaction content in the actual transaction information can be the same or different based on different services that the data processing method is applied. For example, the data processing method can be applied to a transfer service. As such, the transaction content in the actual transaction information can include a transaction amount. For another example, the data processing method can be applied to a storage service. As such, the transaction content in the actual transaction information can include storage information. The initiator's account identifier can be used to identify the initiator's account, for example, can be a name or an address of the initiator's account. In an implementation of this embodiment, the actual transaction information possibly does not include a receiver's account identifier. For example, in some storage services, the initiator can have no peer transaction party. Therefore, the actual transaction information possibly does not include a receiver's account identifier. In another implementation of this embodiment, the actual transaction information can include a receiver's account identifier. For example, in some transfer services, the initiator needs to have a peer transaction party. Therefore, the actual transaction information can include a receiver's account identifier. The receiver's account identifier can be used to identify a receiver's account, for example, can be a name or an address of the receiver's account. In addition, it is worthwhile to note that, based on different services that the data processing method is applied, types of the receiver can be the same or different, and types of the receiver's account can be the same or different. For example, the data processing method can be applied to a transfer service. As such, the receiver can be a payee, and the receiver's account can be a payee's account.

The false transaction information can be transaction information faked by the initiator's server. The false transaction information can include transaction content and an initiator's account identifier. The transaction content in the false transaction information can be the same or different based on different services that the data processing method is applied. For example, the data processing method can be applied to a transfer service. As such, the transaction content in the false transaction information can include a transaction amount with a value of zero. Therefore, after the false transaction information is submitted to the blockchain in a subsequent process, a balance of the initiator's account and a balance of the receiver's account can remain unchanged. For another example, the data processing method can be applied to a storage service. As such, the transaction content in false transaction information can include blank storage information. Corresponding to the actual transaction information, the false transaction information possibly does not include a receiver's account identifier, or possibly include a receiver's account identifier.

In some embodiments, a value of the submission time interval can be flexibly set based on service needs. Specifically, the value of the submission time interval can be a fixed value; or time periods can be obtained through division based on actual service needs, and a fixed value can be set in each time period; or the value of the submission time interval can be a random value. For example, the value of the submission time interval in a peak transaction period can be set to 0.1 second (or can be set to be shorter or longer based on service needs). The value of the submission time interval in a low transaction period can be set to 1 minute (or can be set to be shorter or longer based on service needs). Certainly, the value of the submission time interval can be set based on a distribution function so that the value of the submission time interval satisfies the distribution function. For example, the distribution function can include an exponential distribution function and an Erlang distribution (Erlang Distribution) function. An expression of the exponential distribution function can be $$f(x, \lambda) = \begin{cases} \lambda e^{-\lambda x}, & x \geq 0 \\ 0, & x < 0 \end{cases},$$

and an expression of the Erlang distribution function can be $$f(x, k, \lambda) = \frac{\lambda^k x^{k-1} e^{-\lambda x}}{(k-1)!}.$$

Here x represents the value of the submission time interval, $\lambda$ represents an arrival rate, and k represents a stage of the Erlang distribution function. The arrival rate can represent a quantity of events occurring within a unit of time. In some scenario examples, the arrival rate can specifically represent a transaction quantity in a unit of time. In an actual service, for example, an expected transaction (including an actual transaction and a false transaction) arrival rate D in the submission time interval can be set, and an actual arrival rate E of an actual transaction can be counted. As such, $\lambda$=D−E in the exponential distribution function and the Erlang distribution function. Certainly, a person skilled in the art should understand that the previous method for setting the value of the submission time interval based on the distribution function and the Erlang distribution function is merely an example. Actually, the value of the submission time interval can be set based on the distribution function and the Erlang distribution function in any other appropriate methods.

In some embodiments, the initiator's server can add the base time and the submission time interval to obtain the submission time. Specifically, the initiator's server can add a latest time of submitting transaction information to the blockchain and the submission time interval to obtain the submission time. Here the latest time of submitting the transaction information to the blockchain can be a time of submitting the false transaction information or a time of submitting the actual transaction information. Alternatively, here the latest time of submitting the transaction information to the blockchain can be only a time of submitting the false transaction information.

Step S12: Generate false transaction information when the submission time arrives.

In some embodiments, the initiator's server can obtain the initiator's account identifier of the initiator's account as an initiator's account identifier in the false transaction information, and can obtain the transaction content in the false transaction information. The transaction content can be generated by the initiator's server, and therefore, the initiator's server can generate the transaction content as the transaction content in the false transaction information. For example, the generated transaction content can include a transaction amount with a value of zero. Alternatively, the transaction content can be entered by a user, and therefore, the initiator's server can receive the transaction content entered by the user as the transaction content in the false transaction information. Alternatively, the transaction content can be sent by another device, and therefore, the initiator's server can receive the transaction content sent by the another device as the transaction content in the false transaction information. Alternatively, the transaction content can be locally stored in advance, and therefore, the initiator's server can locally read the transaction content as the transaction content in the false transaction information. For example, the read transaction content can include blank certificate information, etc. Certainly, the transaction content in the false transaction information can be obtained in another method. This is not specifically limited here in some embodiments.

In some embodiments, the initiator's server can directly generate the false transaction information when the submission time arrives; or the initiator's server possibly obtains the actual transaction information in the submission time interval. For a method for obtaining the actual transaction information by the initiator's server, reference can be made to step S10. Details are omitted here for simplicity. After obtaining the actual transaction information, the initiator's server can use the obtained actual transaction information as actual transaction information to be submitted. As such, the initiator's server can determine whether the actual transaction information to be submitted exists when the submission time arrives, and generate the false transaction information when no actual transaction information to be submitted exists. Therefore, the initiator's server can delay submission of the actual transaction information obtained in the submission time interval until the submission time interval.

In an implementation of this embodiment, the initiator's server can obtain an account identifier as a receiver's account identifier in the false transaction information. The initiator's server can obtain the account identifier in any method. For example, the initiator's server can randomly select an account identifier from the blockchain as the receiver's account identifier in the false transaction information. For another example, the initiator's server can provide an account identifier set. The account identifier set can be set in advance, and specifically include at least one receiver's account identifier. Each receiver's account identifier can correspond to a baseline transaction ratio. The baseline transaction ratio can be flexibly set based on actual needs. As such, the initiator's server can obtain an actual transaction ratio between the initiator's account identifier and each receiver's account identifier in the account identifier set, and select a receiver's account identifier whose actual transaction ratio is less than or equal to the baseline transaction ratio from the account identifier set as the receiver's account identifier in the false transaction information.

Step S14: Perform privacy protection processing on transaction content in the false transaction information.

In some embodiments, the initiator's server can perform privacy protection processing on the transaction content in the false transaction information by using any algorithm. For example, the any algorithm can include a commitment algorithm, a homomorphic encryption algorithm, a hash algorithm, etc. For example, the commitment algorithm can include a Pedersen commitment algorithm, and the homomorphic encryption algorithm can include a Paillier algorithm, an Okamoto-Uchiyama algorithm, a Boneh-Goh-Nissim algorithm, etc. For example, the transaction content in the false transaction information can include a transaction amount with a value of zero. As such, the initiator's server can perform privacy protection processing on the transaction amount with a value of zero by using the homomorphic encryption algorithm. For another example, the transaction content in the false transaction information can include blank storage information. As such, the initiator's server can calculate a hash value of the blank certificate information by using the hash algorithm.

Step S16: Submit the false transaction information to the blockchain.

In some embodiments, the initiator's server can submit the false transaction information to the blockchain so that a consensus blockchain node in the blockchain can update at least one of the following: a status of the initiator's account or a status of the receiver's account based on the transaction content in the false transaction information. For example, the transaction content in the false transaction information can include a transaction amount with a value of zero. As such, the consensus blockchain node in the blockchain can update a balance of the initiator's account and a balance of the receiver's account based on the transaction amount with a value of zero. Therefore, the balance of the initiator's account and the balance of the receiver's account can remain unchanged.

In an implementation of this embodiment, the initiator's server can further generate verification information based on the false transaction information before submitting the false transaction information to the blockchain, and can add the verification information to the false transaction information. For example, the verification information can include signature information of the false transaction information.

In an implementation of this embodiment, the initiator's server possibly obtains actual transaction information in the submission time interval. For a method for obtaining the actual transaction information by the initiator's server, reference can be made to step S10. Details are omitted here for simplicity. The initiator's server can perform privacy protection processing on transaction content in the actual transaction information after obtaining the actual transaction information, and submit the actual transaction information to the blockchain so that the consensus blockchain node in the blockchain can update at least one of the following: a status of the initiator's account or a status of the receiver's account based on the transaction content in the actual transaction information. As such, the initiator's server can immediately submit the actual transaction information after obtaining the actual transaction information.

In some embodiments, the initiator's server unregularly submits, to the blockchain, the false transaction information whose transaction content undergoes privacy protection processing so that a third party cannot distinguish between the actual transaction information and the false transaction information submitted to the blockchain, thereby hiding a quantity of times of submitting the actual transaction information to the blockchain, and further hiding a transaction quantity of an initiator's account in the blockchain. In addition, because the third party cannot distinguish between the actual transaction information and the false transaction information submitted to the blockchain, an actual transaction time, an actual transaction account, etc. can also be hidden in some embodiments.

Figure 2:
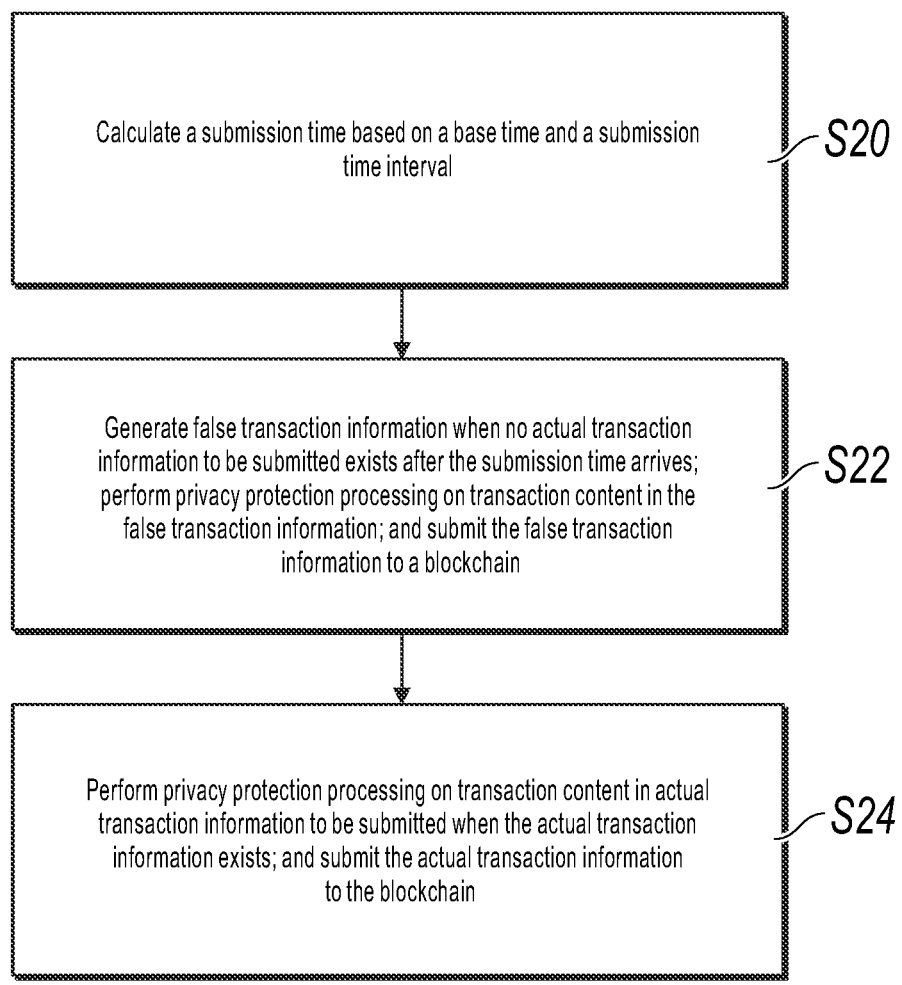
FIG. 2 is a flowchart illustrating a data processing method, according to an embodiment of the present specification.

Referring to FIG. 2, the embodiments of the present specification further provide another blockchain-based data processing method. The data processing method is executed by an initiator's server, and the initiator's server can join a blockchain network as a blockchain node. An initiator's account can be logged in to the initiator's server, and the initiator's account can be an account of an initiator in the blockchain. The initiator's server can communicate with a client device. The data processing method can include the following steps.

Step S20: Calculate a submission time based on a base time and a submission time interval.

In some embodiments, step S20 can be explained in comparison with step S10 in the previous embodiment.

Step S22: Generate false transaction information when no actual transaction information to be submitted exists when the submission time arrives; perform privacy protection processing on transaction content in the false transaction information; and submit the false transaction information to the blockchain.

In some embodiments, step S22 can be explained in comparison with step S12 in the previous embodiment.

Step S24: Perform privacy protection processing on transaction content in actual transaction information to be submitted when the actual transaction information exists; and submit the actual transaction information to the blockchain.

In some embodiments, there can be one or more pieces of actual transaction information to be submitted. Specifically, when there is one piece of actual transaction information to be submitted, the initiator's server can perform privacy protection processing on transaction content in the actual transaction information, and submit the actual transaction information to the blockchain. When there are a plurality of pieces of actual transaction information to be submitted, the initiator's server can select one piece of actual transaction information from the plurality of pieces of actual transaction information to be submitted, perform privacy protection processing on transaction content in the actual transaction information, and submit the actual transaction information to the blockchain. The initiator's server can select the actual transaction information in any method. For example, the initiator's server can randomly select the actual transaction information. For another example, the initiator's server can select actual transaction information at the earliest time.

In some embodiments, the initiator's server unregularly submits, to the blockchain, the false transaction information whose transaction content undergoes privacy protection processing so that a third party cannot distinguish between the actual transaction information and the false transaction information submitted to the blockchain, thereby hiding a quantity of times of submitting the actual transaction information to the blockchain, and further hiding a transaction quantity of an initiator's account in the blockchain. In addition, because the third party cannot distinguish between the actual transaction information and the false transaction information submitted to the blockchain, an actual transaction time, an actual transaction account, etc. can also be hidden in some embodiments.

The following describes a scenario example of the embodiments of the present specification.

The initiator's server can add a latest time of submitting transaction information to the blockchain and the submission time interval to obtain the submission time. Here the latest time of submitting the transaction information to the blockchain can be a time of submitting the false transaction information or a time of submitting the actual transaction information. The initiator's server can determine whether actual transaction information to be submitted exists when the submission time arrives. When no actual transaction information to be submitted exits, the initiating server can generate false transaction information, perform privacy protection processing on transaction content in the false transaction information, and submit the false transaction information to the blockchain. When the actual transaction information to be submitted exists, the initiator's server can perform privacy protection processing on transaction content in the actual transaction information, and submit the actual transaction information to the blockchain.

The following describes another scenario example of the embodiments of the present specification.

The initiator's server can add a latest time of submitting transaction information to the blockchain and the submission time interval to obtain the submission time. Here the latest time of submitting the transaction information to the blockchain can be a time of submitting the false transaction information or a time of submitting the actual transaction information. The initiator's server can generate false transaction information when the submission time arrives, perform privacy protection processing on transaction content in the false transaction information, and submit the false transaction information to the blockchain. In addition, the initiator's server can perform privacy protection processing on transaction content in the actual transaction information after obtaining the actual transaction information, and submit the actual transaction information to the blockchain so as to immediately submit the actual transaction information to the blockchain.

The following describes another scenario example of the embodiments of the present specification.

The initiator's server can add a latest time of submitting transaction information to the blockchain and the submission time interval to obtain the submission time. Here the latest time of submitting the transaction information to the blockchain here can be only a time of submitting the false transaction information. The initiator's server can generate false transaction information when the submission time arrives, perform privacy protection processing on transaction content in the false transaction information, and submit the false transaction information to the blockchain. In addition, the initiator's server can perform privacy protection processing on transaction content in the actual transaction information after obtaining the actual transaction information, and submit the actual transaction information to the blockchain so as to immediately submit the actual transaction information to the blockchain.

Figure 3:
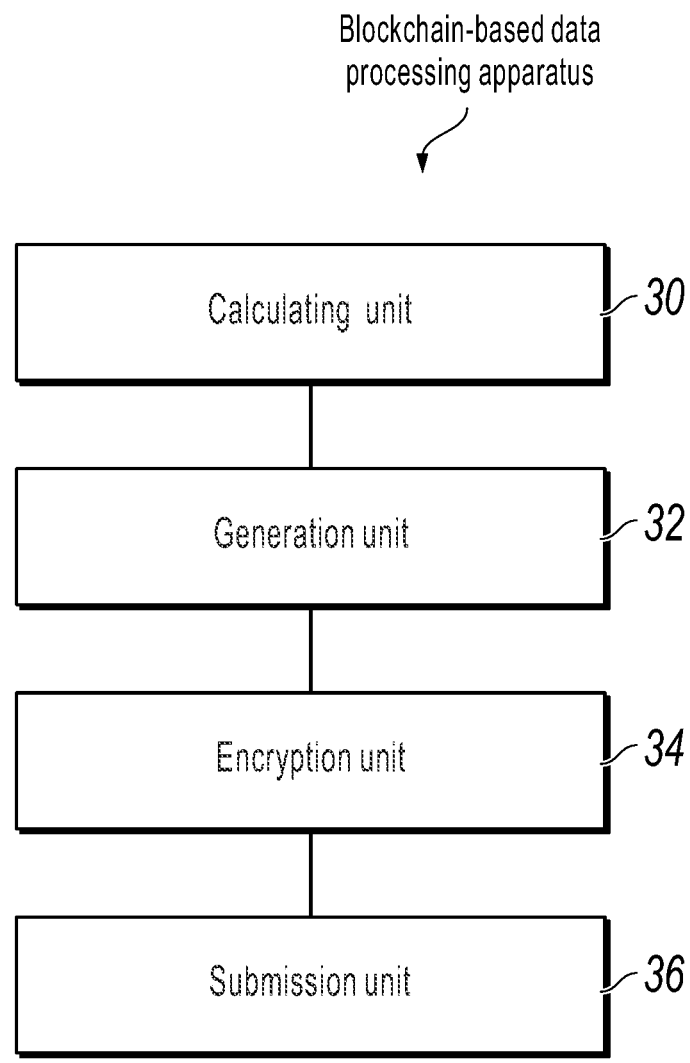
FIG. 3 is a schematic structural diagram illustrating a function of a data processing apparatus, according to an embodiment of the present specification.

Referring to FIG. 3, the embodiments of the present specification provide a blockchain-based data processing apparatus. The apparatus can include the following units: a calculating unit 30, configured to calculate a submission time based on a base time and a submission time interval; a generation unit 32, configured to generate false transaction information when the submission time arrives; an encryption unit 34, configured to perform privacy protection processing on transaction content in the false transaction information; and a submission unit 36, configured to submit the false transaction information to a blockchain.

Figure 4:
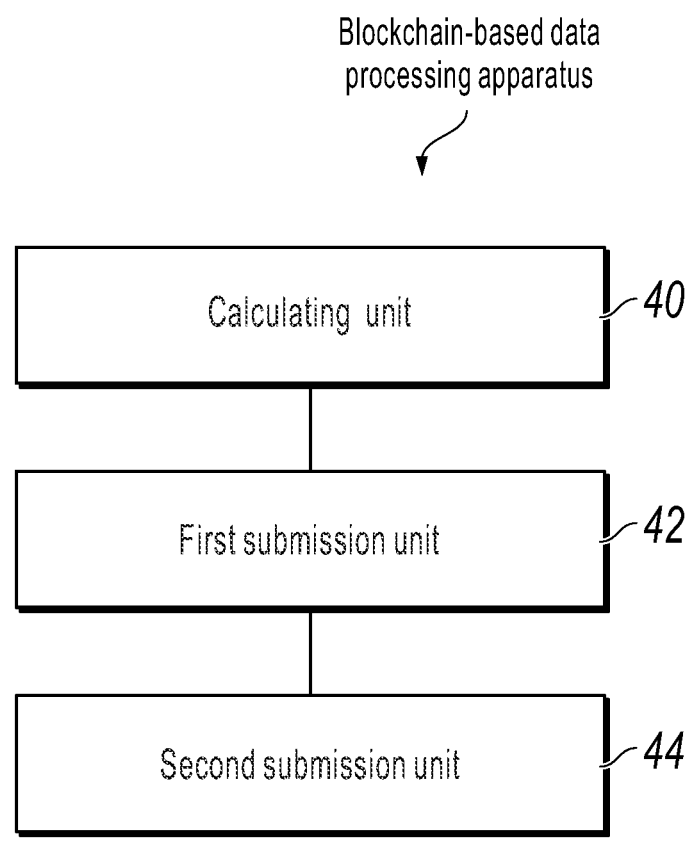
FIG. 4 is a schematic structural diagram illustrating a function of a data processing apparatus, according to an embodiment of the present specification.

Referring to FIG. 4, the embodiments of the present specification provide a blockchain-based data processing apparatus. The apparatus can include the following units: a calculating unit 40, configured to calculate a submission time based on a base time and a submission time interval; a first submission unit 42, configured to: generate false transaction information when no actual transaction information to be submitted exists when the submission time arrives; perform privacy protection processing on transaction content in the false transaction information; and submit the false transaction information to a blockchain; and a second submission unit 44, configured to: perform privacy protection processing on transaction content in actual transaction information to be submitted when the actual transaction information exists; and submit the actual transaction information to a blockchain.

Figure 5:
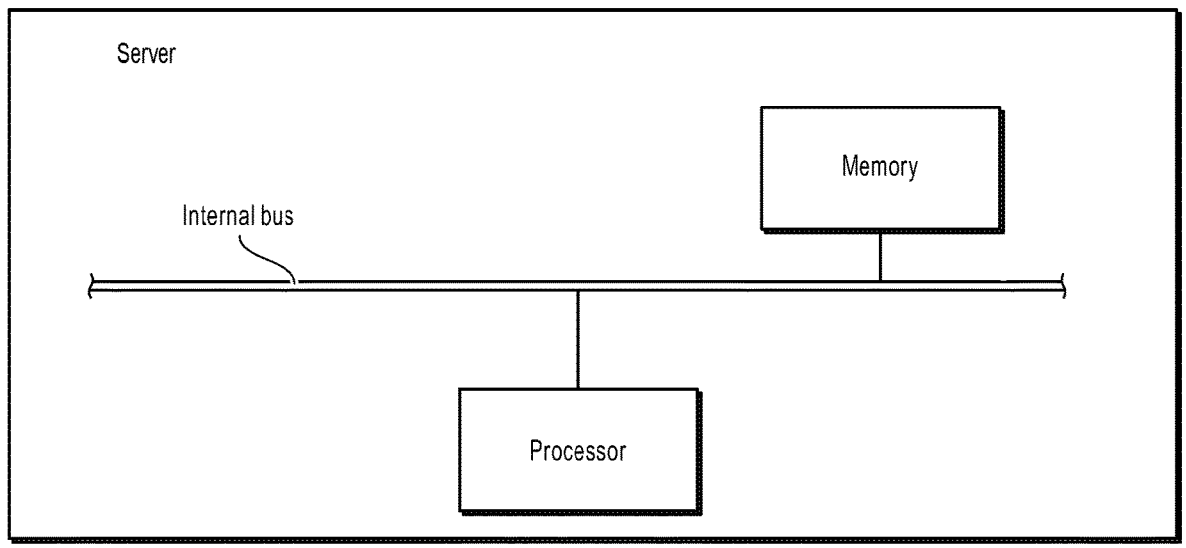
FIG. 5 is a schematic structural diagram illustrating a function of a server, according to an embodiment of the present specification.

Referring to FIG. 5, the embodiments of the present specification further provide a server, and the server may include a memory and a processor.

In some embodiments, the memory can be implemented in any suitable method. For example, the memory can be a read-only memory, a mechanical disk, a solid-state disk, a USB flash drive, etc. The memory can be configured to store a computer instruction.

In some embodiments, the processor can be implemented in any suitable method. For example, the processor can be in a form of a microprocessor or a processor and a computer readable medium storing computer readable program code (such as software or firmware) that can be executed by the (micro) processor, a logic gate, a switch, an application specific integrated circuit (ASIC), a programmable logic controller, an embedded microcontroller, etc. The processor can execute the computer instruction to implement the following steps: calculating a submission time based on a base time and a submission time interval; generating false transaction information when no actual transaction information to be submitted exists when the submission time arrives; performing privacy protection processing on transaction content in the false transaction information; and submitting the false transaction information to a blockchain; or performing privacy protection processing on transaction content in actual transaction information to be submitted when the actual transaction information exists; and submitting the actual transaction information to a blockchain.

Refer to FIG. 5, the embodiments of the present specification further provide a server. The server can include a memory and a processor.

In some embodiments, the memory can be implemented in any suitable method. For example, the memory can be a read-only memory, a mechanical disk, a solid-state disk, a USB flash drive, etc. The memory can be configured to store a computer instruction.

In some embodiments, the processor can be implemented in any suitable method. For example, the processor can be in a form of a microprocessor or a processor and a computer readable medium storing computer readable program code (such as software or firmware) that can be executed by the (micro) processor, a logic gate, a switch, an application specific integrated circuit (ASIC), a programmable logic controller, an embedded microcontroller, etc. The processor can execute the computer instruction to implement the following steps: calculating a submission time based on a base time and a submission time interval; generating false transaction information when no actual transaction information to be submitted exists when the submission time arrives; performing privacy protection processing on transaction content in the false transaction information; and submitting the false transaction information to a blockchain; or performing privacy protection processing on transaction content in actual transaction information to be submitted when the actual transaction information exists; and submitting the actual transaction information to a blockchain.

It is worthwhile to note that the embodiments in the present specification are described in a progressive way. For same or similar parts of the embodiments, references can be made to the embodiments mutually. Each embodiment focuses on a difference from other embodiments. In particular, the apparatus embodiment and the server embodiment are simply described because the apparatus embodiment and the server embodiment are basically similar to the method embodiment. For related parts, reference can be made to partial descriptions of the method embodiment.

After reading the present specification document, a person skilled in the art can figure out any combination of some or all of the embodiments enumerated in the present specification without creative effects. These combinations also fall within the scope disclosed and protected by the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, the current improvement for many method procedures can be considered as a direct improvement of a hardware circuit structure. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email receiving and sending device, a game console, a tablet computer, a wearable device, or any combination of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in the embodiments or in some parts of the embodiments of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumption electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the embodiments, a person of ordinary skill in the art knows that many variations of the present specification can be made without departing from the spirit of the present specification. It is expected that the appended claims include these variations without departing from the spirit of the present specification.

What is claimed is:

1. A computer-implemented blockchain-based transaction obfuscation method, comprising:
 determining a submission time based on a base time and a submission time interval;
 determining that no actual transaction information is obtained between the base time and the submission time during the submission time interval;

generating false transaction information;
cryptographically encoding transaction content in the false transaction information; and
subsequent to the submission time, submitting the false transaction information to a blockchain to obfuscate a number of actual transactions in the blockchain.

2. The computer-implemented method of claim 1, wherein the base time comprises at least one of:
a time of submitting previous false transaction information to the blockchain; or
a time of submitting previous actual transaction information to the blockchain.

3. The computer-implemented method of claim 1, wherein generating the false transaction information comprises:
generating the false transaction information in response to determining that no actual transaction information is obtained.

4. The computer-implemented method of claim 1, further comprising:
determining a second submission time based on a time of submitting the false transaction information and based on a second submission time interval;
between the time of submitting the false transaction information and the second submission time during the second submission time interval, obtaining actual transaction information;
cryptographically encoding actual transaction content in the actual transaction information; and
submitting the actual transaction information to the blockchain.

5. The computer-implemented method of claim 1, comprising determining the submission time interval based on an exponential distribution or an Erlang distribution.

6. The computer-implemented method of claim 1, wherein the transaction content in the false transaction information comprises at least one of:
a transaction amount with a value of zero; or
blank storage information.

7. The computer-implemented method of claim 1, wherein generating the false transaction information comprises:
randomly selecting an account identifier from the blockchain as a receiver account identifier in the false transaction information.

8. The computer-implemented method of claim 1, further comprising:
obtaining an account identifier set, wherein the account identifier set comprises a plurality of account identifiers, and wherein each account identifier corresponds to a baseline transaction ratio;
obtaining corresponding ratios of actual transactions between an initiator account identifier and each account identifier in the account identifier set; and
selecting, from the account identifier set, a first account identifier whose ratio of actual transactions with the initiator account identifier is less than or equal to the baseline transaction ratio of the first account identifier; and
including the first account identifier in the false transaction information as a receiver account identifier.

9. A non-transitory, computer-readable medium storing one or more instructions that, when executed by a computer system, cause the computer system to perform operations comprising:
determining a submission time based on a base time and a submission time interval;
determining that no actual transaction information is obtained between the base time and the submission time during the submission time interval;
generating false transaction information;
cryptographically encoding transaction content in the false transaction information; and
subsequent to the submission time, submitting the false transaction information to a blockchain to obfuscate a number of actual transactions in the blockchain.

10. The non-transitory, computer-readable medium of claim 9, wherein the base time comprises at least one of:
a time of submitting previous false transaction information to the blockchain; or
a time of submitting previous actual transaction information to the blockchain.

11. The non-transitory, computer-readable medium of claim 9, wherein generating the false transaction information comprises:
generating the false transaction information in response to determining that no actual transaction information is obtained.

12. The non-transitory, computer-readable medium of claim 9, wherein the operations comprise:
determining a second submission time based on a time of submitting the false transaction information and based on a second submission time interval;
between the time of submitting the false transaction information and the second submission time during the second submission time interval, obtaining actual transaction information;
cryptographically encoding actual transaction content in the actual transaction information; and
submitting the actual transaction information to the blockchain.

13. The non-transitory, computer-readable medium of claim 9, wherein the operations comprise determining the submission time interval based on an exponential distribution or an Erlang distribution.

14. The non-transitory, computer-readable medium of claim 9, wherein the transaction content in the false transaction information comprises at least one of:
a transaction amount with a value of zero; or
blank storage information.

15. The non-transitory, computer-readable medium of claim 9, wherein generating the false transaction information comprises:
randomly selecting an account identifier from the blockchain as a receiver account identifier in the false transaction information.

16. The non-transitory, computer-readable medium of claim 9, wherein the operations comprise:
obtaining an account identifier set, wherein the account identifier set comprises a plurality of account identifiers, and wherein each account identifier corresponds to a baseline transaction ratio;
obtaining corresponding ratios of actual transactions between an initiator account identifier and each account identifier in the account identifier set; and
selecting, from the account identifier set, a first account identifier whose ratio of actual transactions with the initiator account identifier is less than or equal to the baseline transaction ratio of the first account identifier; and
including the first account identifier in the false transaction information as a receiver account identifier.

17. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
determining a submission time based on a base time and a submission time interval;
determining that no actual transaction information is obtained between the base time and the submission time during the submission time interval;
generating false transaction information;
cryptographically encoding transaction content in the false transaction information; and
subsequent to the submission time, submitting the false transaction information to a blockchain to obfuscate a number of actual transactions in the blockchain.

18. The computer-implemented system of claim 17, wherein the base time comprises at least one of:
a time of submitting previous false transaction information to the blockchain; or
a time of submitting previous actual transaction information to the blockchain.

19. The computer-implemented system of claim 17, wherein generating the false transaction information comprises:
generating the false transaction information in response to determining that no actual transaction information is obtained.

20. The computer-implemented system of claim 17, wherein the operations comprise:
determining a second submission time based on a time of submitting the false transaction information and based on a second submission time interval;
between the time of submitting the false transaction information and the second submission time during the second submission time interval, obtaining actual transaction information;
cryptographically encoding actual transaction content in the actual transaction information; and
submitting the actual transaction information to the blockchain.

* * * * *